United States Patent
Long

(10) Patent No.: US 10,477,782 B1
(45) Date of Patent: Nov. 19, 2019

(54) SUPPORT SYSTEMS AND METHODS FOR TREES AND BUSHES

(71) Applicant: Rodney Long, North Lakewood, WA (US)

(72) Inventor: Rodney Long, North Lakewood, WA (US)

( * ) Notice: Subject to any disclaimer, the term of this patent is extended or adjusted under 35 U.S.C. 154(b) by 23 days.

(21) Appl. No.: 14/936,083

(22) Filed: Nov. 9, 2015

(51) Int. Cl.
*A01G 9/12* (2006.01)

(52) U.S. Cl.
CPC .............. *A01G 9/128* (2013.01); *A01G 9/12* (2013.01)

(58) Field of Classification Search
USPC .......................................... 47/47, 42, 44, 46
See application file for complete search history.

(56) References Cited

U.S. PATENT DOCUMENTS

| | | | | |
|---|---|---|---|---|
| 834,867 A * | 10/1906 | Biesemeier | ............... | D21F 1/10 140/23 |
| 881,593 A * | 3/1908 | Knox | ..................... | A01G 17/06 47/46 |
| 896,701 A * | 8/1908 | Austin | ..................... | A01G 9/12 47/45 |
| 899,046 A * | 9/1908 | Henshaw | ................. | A01G 9/12 47/45 |
| 947,912 A * | 2/1910 | Jaquet | .................... | A01G 17/06 47/46 |
| 965,599 A * | 7/1910 | Ramsburg | ............. | A01G 17/06 24/131 R |
| 1,338,612 A | 4/1920 | Buschardt | | |
| 1,529,705 A * | 3/1925 | McKnight | .............. | A01G 17/06 211/181.1 |
| 1,543,957 A * | 6/1925 | Steiner | ................... | A01G 17/06 33/8 |
| 1,659,116 A * | 2/1928 | McOlvin | .................. | A01G 9/12 245/3 |
| 1,890,217 A * | 12/1932 | Dobbins | ................ | A01G 9/128 47/44 |
| 3,302,328 A | 2/1967 | King | | |
| 3,494,072 A * | 2/1970 | Olson | ..................... | A01G 17/08 24/487 |
| 3,518,791 A * | 7/1970 | Carson | ................... | A01G 17/08 24/115 R |
| 3,526,993 A | 9/1970 | Siebol | | |
| 3,972,511 A * | 8/1976 | Balestrini | ............... | E04H 17/10 256/47 |
| 4,329,762 A * | 5/1982 | Maidhof | ................ | A01G 17/08 24/16 PB |

(Continued)

*Primary Examiner* — Andrea M Valenti
(74) *Attorney, Agent, or Firm* — Schacht Law Office, Inc.; Dwayne Rogge

(57) ABSTRACT

Disclosed herein is a support system for temporarily supporting a plant via a fixed structure of vertical poles which support at least one substantially horizontal support cord, the support system comprising: a substantially vertical alignment wire having a top end and a bottom end; a curve greater than 180° in the top end of the vertical alignment wire forming a hanging hook portion configured to be selectively supported by one of the support cords; at least one supporting bracket coupled to one of the substantially horizontal support cords and capturing the alignment wire and the plant; wherein the alignment wire maintains vertical orientation of the plant substantially above the point at which the plane protrudes from the ground.

8 Claims, 3 Drawing Sheets

(56) References Cited

U.S. PATENT DOCUMENTS

| | | | | |
|---|---|---|---|---|
| 5,004,211 | A | * | 4/1991 | Rayner ................. E04H 17/10 256/35 |
| 5,052,086 | A | | 10/1991 | Nasuno |
| 5,210,973 | A | * | 5/1993 | Kratky ................. A01G 9/128 47/44 |
| 6,254,049 | B1 | * | 7/2001 | Goehly ................. A01G 17/08 248/302 |
| 6,378,175 | B1 | | 4/2002 | Vanderpan |
| 6,389,656 | B1 | * | 5/2002 | Pellikaan ............... A01G 9/128 24/326 |
| 2005/0188610 | A1 | * | 9/2005 | Shaver ................. A01G 17/06 47/46 |
| 2013/0042525 | A1 | * | 2/2013 | Bortolussi ............. A01G 17/06 47/46 |
| 2013/0125457 | A1 | * | 5/2013 | Pennors ................ A01G 9/126 47/44 |
| 2015/0342131 | A1 | * | 12/2015 | Torres Carpio ........ A01G 9/126 47/44 |

\* cited by examiner

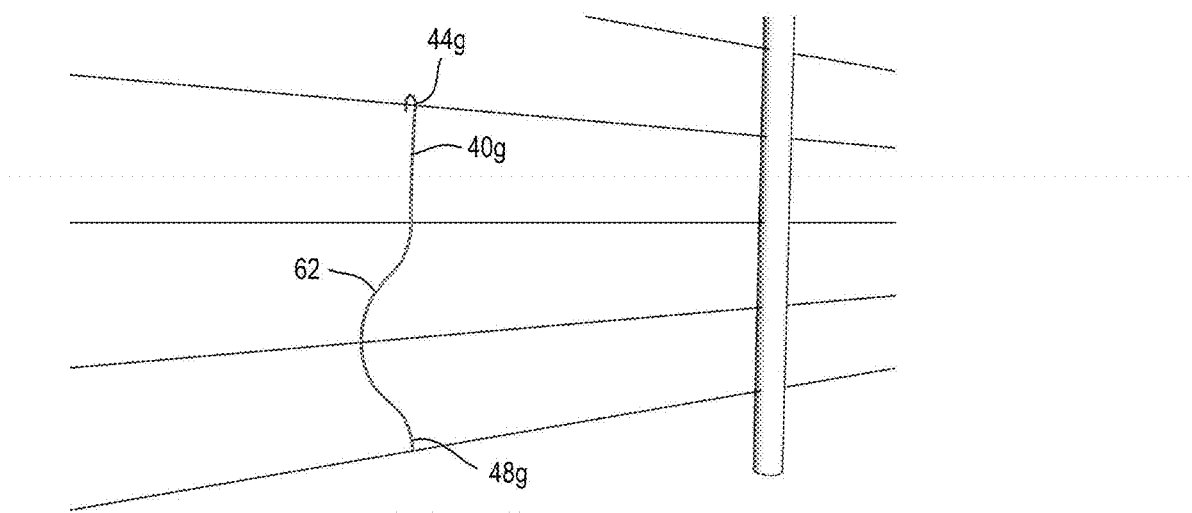
Fig. 6
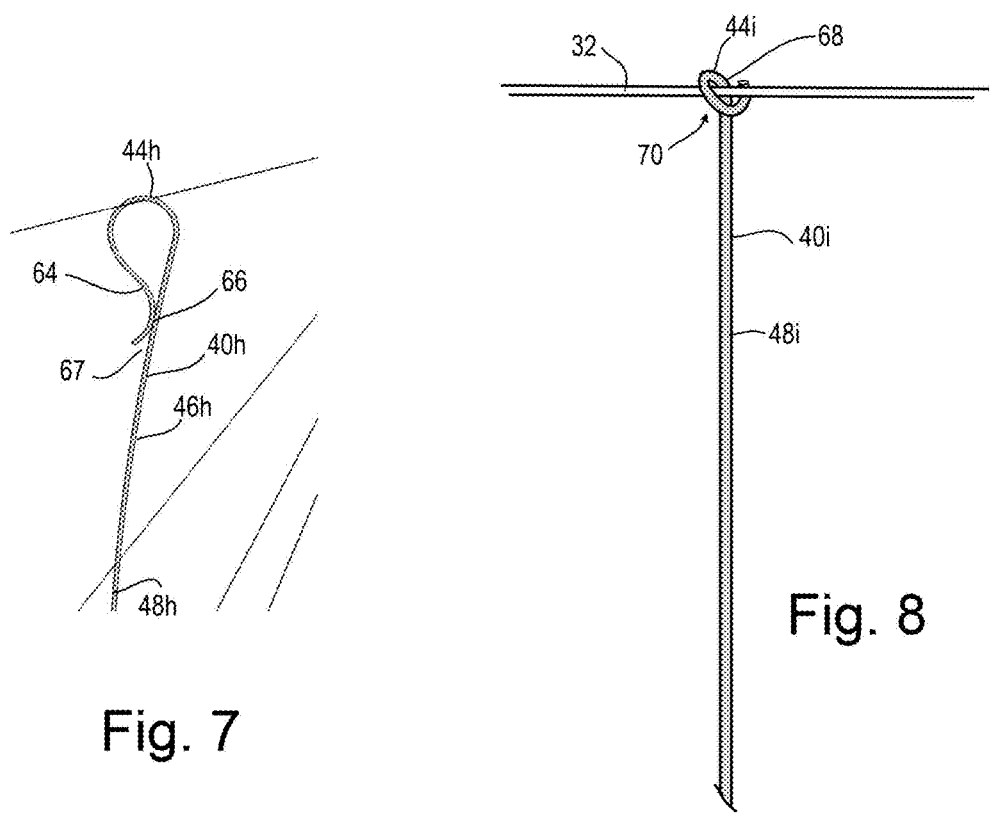
Fig. 7
Fig. 8

SUPPORT SYSTEMS AND METHODS FOR TREES AND BUSHES

BACKGROUND OF THE DISCLOSURE

Field of the Disclosure

This invention relates to the field of devices used in orchards or the like for releasably supporting a plant against a support structure having substantially horizontal support members and in particular to a vertical alignment wire for alignment and intermediate plant attachments adapted for supporting such plants against the substantially horizontal support members.

BRIEF SUMMARY OF THE DISCLOSURE

Disclosed herein is a support system for temporarily supporting a plant via a fixed structure of vertical poles which support at least one substantially horizontal support cord, the support system comprising: a substantially vertical alignment wire having a top end and a bottom end; a curve greater than 180° in the top end of the vertical alignment wire forming a hanging hook portion configured to be selectively supported by one of the support cords; at least one supporting bracket coupled to one of the substantially horizontal support cords and capturing the alignment wire and the plant; wherein the alignment wire maintains vertical orientation of the plant substantially above the point at which the plane protrudes from the ground.

The support system may further comprise at least one connection band capturing the plant and the alignment wire.

The support system may be arranged wherein the connection band captures the plant, the alignment wire, and at least one support cord.

The support system may be arranged wherein the curve in the top end of the alignment wire is configured to contact a bottom portion of the support cord when the alignment wire is lifted.

The support system may be arranged wherein the curve in the top end of the alignment wire comprises a reverse curve portion forming a gap between the reverse curve and a vertical extension that is smaller than the support cord.

The support system may be arranged wherein the curve in the top end of the alignment wire comprises a reverse curve portion which contacts a vertical extension portion of the alignment wire.

The support system may be arranged wherein the curve in the top end of the alignment wire is greater than 360°.

BRIEF DESCRIPTION OF THE SEVERAL VIEWS OF THE DRAWINGS

FIG. 6 shows the example of FIG. 1 with a plurality of longitudinal bends.

FIG. 7 in an enlarged view of one example of the curved hook portion of FIG. 1.

FIG. 8 in an enlarged view of another example of the curved hook portion of FIG. 1.

DETAILED DESCRIPTION OF THE DISCLOSURE

Figure 1:
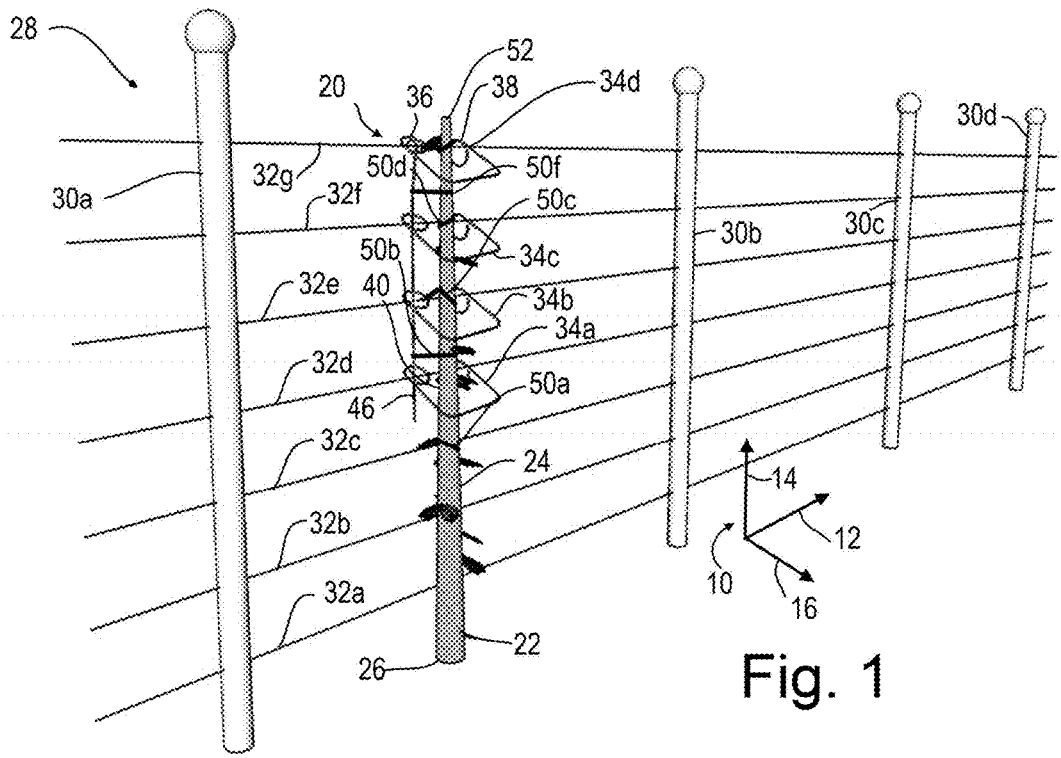
FIG. 1 is an environmental view of one example of the support system and method for trees and bushes (plants).

Disclosed herein is a support system 20 and method for supporting trees and bushes (plants) 22 such as in an orchard or other location wherein the plant 22 is not expected to grow in the correct or desired 5 manner. For example, it may be desired to provide a plant 22 with a trunk 24 that grows in vertical alignment directly above the bottom 26 of the plant where the plant protrudes from the ground 26 such that the trunk 24 will not buckle or bend in later stages of development, such as when weight is added from rain or fruit, or when other outside forces are 10 encountered such as wind.

In the fields of growing of plants, especially fruit and vegetable bearing plants, is often desire to have a single plant 22 produce as much food as possible in as small of a plant footprint as is possible. Thus, plants 22 are commonly grown in longitudinal rows which allows maximum access to the produce (grains, fruit, or vegetables) of the plant with as narrow a transverse footprint as possible. Such rows of plants are well-known in the fields of tomatoes, raspberries, blackberries, grapes and more recently in the fields of trees such as apples, oranges, pears, plums etc. These plants are often maximized in a longitudinal direction 12 (see the axes 10 of FIG. 1) as well as often maximized in a vertical direction 14, while being substantially minimized in a transverse direction 16. This growth arrangement results in a plant 22 which is often not stable without support in the transverse direction 16 and may also not be stable without support in the longitudinal direction 12. Thus, it is common to provide a fixed support structure 28 (trellis) generally comprising a plurality of vertically oriented posts 30 with a plurality of substantially horizontal support cords 32. The support cords may be metallic strands (wires), synthetic or natural fiber ropes, strings, small diameter rods etc.

There could be many wire formations (support cord) used to accommodate different orchards, vineyards, and trellis systems, all serving the same purpose.

In this disclosure, general components will have a numeric label (such as support cord 32) and specific components may have an alphabetic suffix (such as the lowermost or first horizontal support cord labeled as 32a). Traditionally, the trunk 24 or branches of the plant 22 are attached to the horizontal support cords 32 by way of a supporting bracket 34 which engages on one end 36 the support cord 32, wraps around or captures the trunk 24 or branch of the plant 22. Each supporting bracket having a second and 38 which also engages the support cord 32. One such example of this sort of supporting bracket is disclosed in U.S. Pat. No. 6,254,049, incorporated herein by reference.

Figure 2:
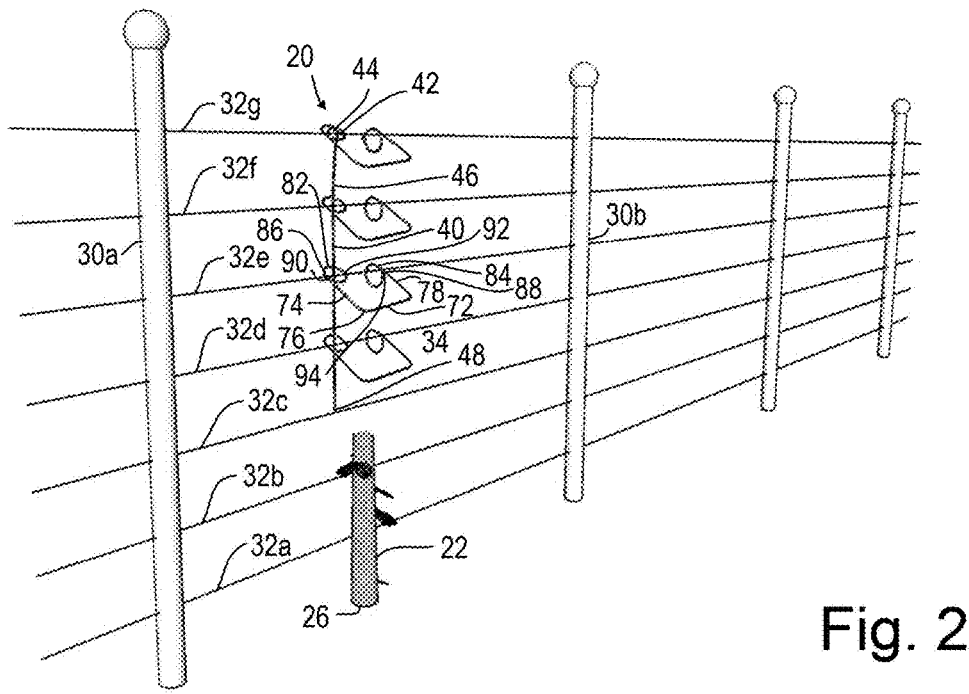
FIG. 2 shows FIG. 1 with the plant removed.

The supporting bracket 34 is shown in one example in FIG. 2 comprising a base segment 72, a first leg 74 extending from a first end 76 of the base segment first leg 74, and a second leg 78 extending from a second end 80 of the base segment 72, opposite the first end 76 of the base segment 72. A first loop 82 is formed at the first leg 74. A second loop 84 is formed at the second leg 78. The first loop 82, lying in a first plane; the second loop 84 lying in a second plane. FIG. 2 shows an example where the first plane generally orthogonal to the second plane. The first loop 82 in one example having a first gap 86 therethrough configured to receive the support cord 32 and the alignment wire 40 into the first loop 82. The second loop 84 having a second gap 88 therethrough configured to receive the support cord 32 into the second loop 84. Wherein the first loop 82 is configured engage the support cord 32, so that the support cord 32 is retained in the first loop 82. Wherein the supporting bracket 34 is configured to be rotated about the first loop 86 such that the support cord 32 is in contact with opposite interior sides 90/92 of the first loop 86, and whereby the supporting bracket 34 may thence be further rotated wherein the second loop 88 engages the support cord 32 and the support cord 32 engages an interior side 94 of the second loop 88.

In such growing arrangements, it is commonly desired that the trunk 24 of the plant 22 grow this substantially straight, and in vertical 14 alignment with the bottom 26 of the plant 22. Thus disclosed herein is a support system 20 as shown in FIG. 2 comprising an alignment wire 40 having at the upper end thereof, a bend 42 forming a hanging hook portion 44 which in this Fig. rests upon the uppermost horizontal support cord 32g.

In this example, the trunk 24 or branches of the plant 22 are attached to the horizontal support cords 32 by way of a supporting bracket 34 which engages on one end 36 the support cord 32 and the alignment wire 40. The supporting bracket 34 then wraps around and captures the trunk 24 or branch of the plant 22.

The alignment wire 40 has a median portion vertically below the hanging hook portion 44 forming a vertical extension 46. The alignment wire 40 having a bottom end 48 substantially vertically below the hook portion 44. The vertical extension 46 providing additional attachment locations for connection bands 50 which may be adhesive tape, twine, zip ties, twist wires, hook and loop fastener bands, snapped bands, or other attachment devices which can be used to connect the alignment wire 40 to the support cords 32 and/or to the trunk 24/branches of the plant 22

FIG. 1 for example shows a first connection band 50a capturing the trunk 24 of the plant 22 as well as the support cord 32c and the alignment wire 40. A second connection band 50b is positioned vertically between the fourth support cord 32d and the fifth support cord 32e and thus captures the trunk 24 of the plant 22 and the alignment wire 40. Attachment in this position would not be possible without the alignment wire 40.

Figure 3:
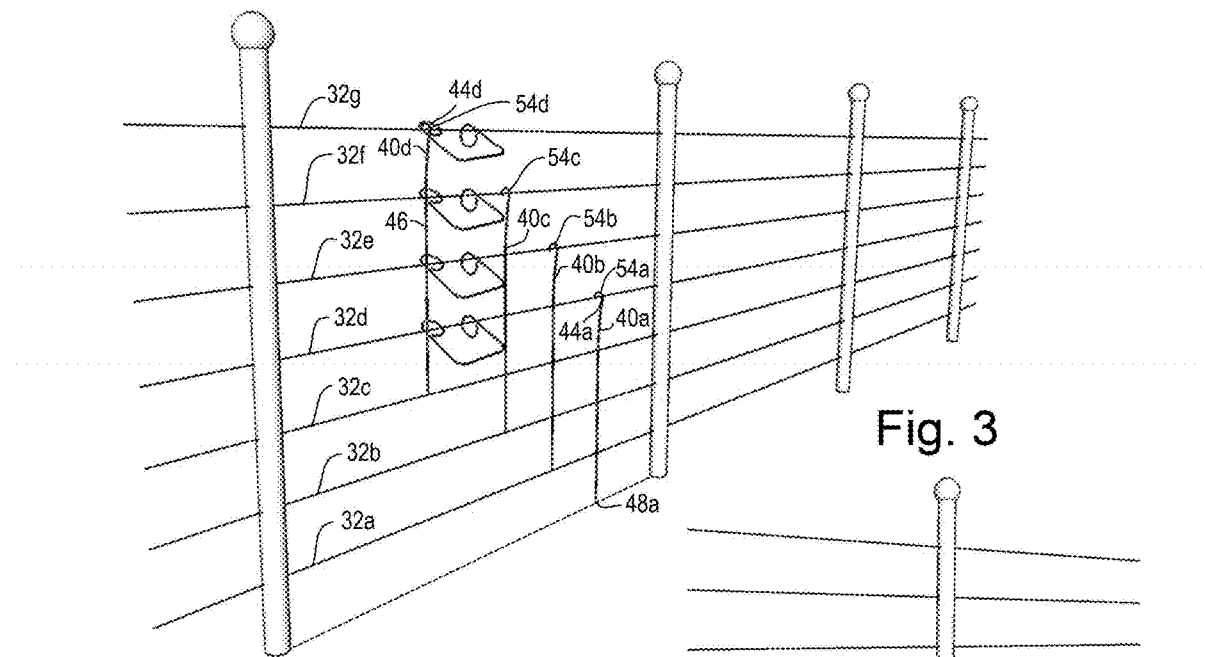
FIG. 3 shows alternate placement of the apparatus shown in FIG. 1 on the fixed support structure.

Looking to FIG. 3 it can be appreciated that the alignment wire 40 is movable to different vertical and horizontal positions by movement of the hanging hook 44 longitudinally along and, vertically by hanging the alignment wire from support cords 32 at different vertical heights. Movement in this way allows continued use of a single alignment wire 40 as the plant 22 grows where the hook portion 44 maintains position relative to the top 52 of the plant 22.

As the alignment wire is rigid, (not easily bending; physically inflexible or stiff) a user is able to grasp the bottom 48 or median portion 46 of the alignment wire 40 and raise the alignment wire 40 without a ladder or stool in that the rigid alignment wire 40 will not bend under its own weight.

As the plant 22 grows, the alignment wire 40 may be repositioned to higher and higher support cords 32. For example, in FIG. 3 the support wire 48 is shown having a hanging hook 44a in a fourth position 54a resting upon the fourth support cord 32d as numbered from the bottom support cord 32a. In this position, the bottom 48a of the alignment wire 40a is substantially at the same horizontal level as the bottom 26 of the plant (ground level 18) and therefore, lower positions than this would result in the lower end 48a being below ground level.

As the plant grows, the alignment wire 40 may be repositioned (raised) from the fourth position 54a to a fifth position 54b, to a sixth position 54c, to a seventh position 54d wherein the hook portion 44d rests upon the uppermost support cord 32g and additional vertical repositioning is not possible without addition of higher support cords 32 or a vertical extension of the support wire 40 extending vertically above the hanging hook portion 44. In one example it is desired that some portion of the hanging hook 40 remain above the top 52 of the plant 22 so as to provide a secure support to the top 52 of the plant 22. As the upper region of the plant 22 in some examples is more susceptible to damage, it is most needed to support this region.

Figure 4:
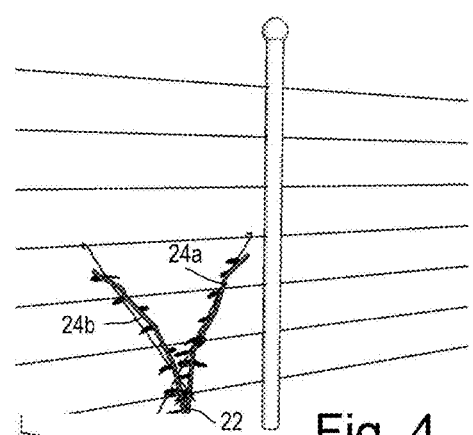
FIG. 4 shows alternate placement of the apparatus shown in FIG. 1 on the fixed support structure.
Figure 5:
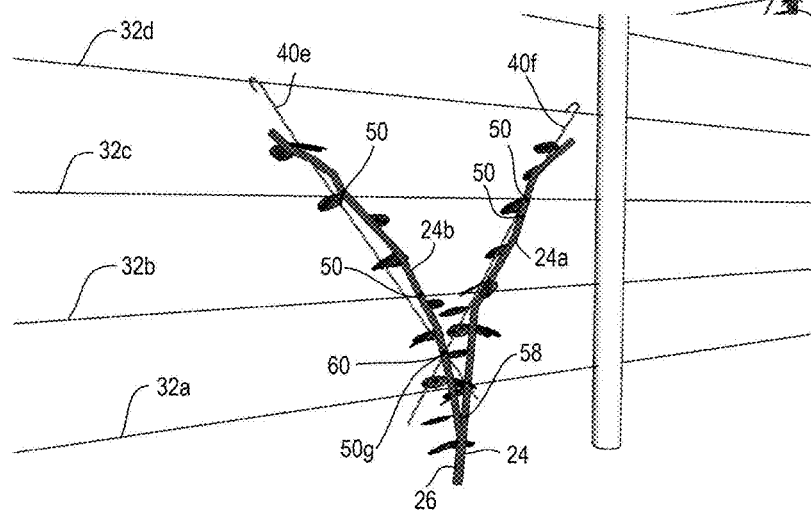
FIG. 5 is an enlarged view of FIG. 4.

Looking to FIG. 4 is shown another example wherein the trunk 24 of the plant 22a has been split at 58 into right trunk 24a and left trunk 24b. This arrangement has been known in some plant varieties to result in a higher volume of produce per base trunk 24. In such an example, it is clear that each of the right trunk 24a and left trunk 24b grow at an angle between 0° and 180° to the vertical axis 14. Thus, a plurality of alignment wires 40f supporting right trunk 24a, and alignment wire 40e supporting left trunk 24b may be provided. A plurality of connection bands 50 may be utilized to attach the right 24a and left trunks 24b to the support cords 32 and/or to the alignment wires 40. In this example, the alignment wires 40 are vertically oriented at an angle greater than 0° and intersect (cross) at an intersection location 60. Another connection band 50g may be utilized to attach the crossing alignment wires 40f and 40e at the intersection 60. In addition, the supporting brackets 34 may be utilized as in the example shown in FIG. 1.

Looking to FIG. 6 is shown another example which may be combined with the other examples disclosed herein. In this example, the alignment wire 40g has a longitudinal bend 62 between the hook portion 44g and the bottom 48 g. This longitudinally bent example may be utilized where angle or bent shape training of the plant 22 is desired. For example, the plant 22 may be attached to the longitudinal bend portion 62 by connecting bands 50.

Looking to FIG. 7 is shown another example which may be combined with the other examples disclosed herein. This example extends the hanging hook 44h curve downward to a reverse curve 64 which touches the vertical extension 46h or nearly touches the vertical extension 46h to form a narrow gap 66 therebetween. This reverse curve 64 restricting the ability of the hook 44h to be accidentally removed from the support cord 32 such as by wind or vibration. In addition, the reverse curve 64 may continue away from the vertical extension 46h to form an entry region 67 assisting in placement of the alignment wire on the support cord 32.

FIG. 8 shows another example where the hanging hook portion 44i continues to form a spiral curve 68. In one form, the spiral curve 68 combined with the hanging hook portion forms a spiral curve which may be greater than 360° in a vertical plane. The spiral curve 68 in one example having an open region 70 on the bottom thereof at an angle of about 45° or between 90° and 0° from the curve of the hanging hook 44i. This arrangement allows the alignment wire 40i to be set upon the support cord 32 past the open region 70, whereupon the alignment wire 40 may be rotated to fully engage the support cord 32, again to restrict the ability of the hook 44i to be accidentally removed from the support cord 32 by wind or vibration.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

The invention claimed is:

1. A support system for temporarily supporting a plant via a fixed structure of vertical poles which support a plurality of substantially horizontal support cords including an upper support cord positioned above a lower support cord above the ground, the support system comprising:
   a substantially rigid, linear, vertical alignment wire having a top end suspended from the upper support cord and a bottom end above the ground,
   the alignment wire angularly repositionable relative to the plurality of substantially horizontal support cords;
   a bend greater than 180° in the top end of the vertical alignment wire, the bend forming a hanging hook portion supported from the upper support cord;
   a supporting bracket comprising a base segment, a first leg extending from a first end of the base segment, and a second leg extending from a second end of the base segment, opposite the first end of the base segment;
   a first loop formed at the first leg;
   a second loop formed at the second leg;
   the first loop, lying in a first plane;
   the second loop lying in a second plane;
   the first plane generally orthogonal to the second plane;
   the first loop having a first gap therethrough;
   the first loop surrounding the lower support cord and the alignment wire;
   the second loop having a second gap therethrough the lower support cord into the second loop;
   wherein the first loop engages the support cord, wherein the lower support cord is in the first loop;
   wherein the supporting bracket is configured to be rotated about the first loop such that the lower support cord is in contact with opposite interior sides of the first loop, and whereby the supporting bracket may thence be further rotated wherein the second loop engages the lower support cord and the lower support cord engages an interior side of the second loop;
   the supporting bracket, attached to the lower support cord, the alignment wire;
   the plant attached directly to the lower support cord via the supporting bracket; and
   wherein the alignment wire maintains vertical orientation of the plant substantially above the point at which the plant protrudes from the ground.

2. A support system for temporarily supporting a plant via a fixed structure of vertical poles wherein the vertical poles support a plurality of substantially horizontal support cords including an upper support cord positioned above a lower cord, the support system comprising:
   a substantially rigid vertical alignment wire suspended from the upper support cord and a bottom end above the ground;
   a spiral curve greater than 360° in a vertical plane in the top end of the vertical alignment wire, the bend forming a hanging hook portion configured to be selectively supported by the upper support cord;
   the spiral curve having an open region at a bottom thereof whereupon the alignment wire may be rotated to fully engage the support cord and restrict the ability of the hanging hook removed from the support cord by wind or vibration;
   a supporting bracket comprising a base segment, a first leg extending from a first end of the base segment, and a second leg extending from a second end of the base segment, opposite the first end of the base segment;
   a first loop formed at the first leg;
   a second loop formed at the second leg;
   the first loop, lying in a first plane;
   the second loop lying in a second plane;
   the first plane generally orthogonal to the second plane;
   the first loop having a first gap therethrough receiving the lower support cord and the alignment wire into the first loop;
   the second loop having a second gap therethrough receiving the lower support cord into the second loop;
   wherein the first loop engages the support cord;
   wherein the lower support cord and the alignment wire are in the first loop; and
   wherein the supporting bracket is positioned about the first loop such that the lower support cord is in contact with opposite interior sides of the first loop whereby the second loop engages the lower support cord and the lower support cord engages an interior side of the second loop;
   wherein the alignment wire maintains vertical orientation of the plant substantially above the point at which the plant protrudes from the ground; and
   at least one connection band having no direct contact with the upper support cord nor lower support cord;
   the connection band attached to the plant and the alignment wire.

3. The support system as recited in claim 1 further comprising a connection band, wherein the connection band is attached to the plant, the alignment wire, and at least one support cord.

4. The support system as recited in claim 1 wherein the hanging hook in the top end of the alignment wire is configured to contact a bottom portion of the support cord when the alignment wire is lifted.

5. The support system as recited in claim 4 wherein the curve in the top end of the alignment wire comprises a reverse curve portion forming a gap between the reverse curve and a vertical extension that is smaller than the support cord.

6. The support system as recited in claim 4 wherein the curve in the top end of the alignment wire comprises a reverse curve portion which contacts a vertical extension portion of the alignment wire.

7. The support system as recited in claim 1 wherein the curve in the top end of the alignment wire is greater than 360° around the upper support cord, the curve having an open region at a bottom thereof whereupon the alignment wire may be rotated to fully engage the support cord and restrict the ability of the hanging hook removed from the support cord by wind or vibration.

8. A support system for temporarily supporting a plant via a fixed structure of vertical poles which support a plurality of substantially horizontal support cords including an upper support cord positioned above a lower support cord, the support system comprising:
   a substantially rigid, linear, vertical alignment wire suspended from the upper support cord and a bottom end above the ground;

the alignment wire angularly repositionable relative to the plurality of substantially horizontal support cords;

a spiral curve greater than 360° in a vertical plane in the top end of the vertical alignment wire, the spiral curve forming a hanging hook portion configured to be selectively supported from the upper support cord;

the spiral curve having an open region at a bottom thereof whereupon the alignment wire may be rotated to fully engage the support cord and restrict the ability of the hanging hook removed from the support cord by wind or vibration;

a supporting bracket comprising a base segment, a first leg extending from a first end of the base segment, and a second leg extending from a second end of the base segment, opposite the first end of the base segment;

a first loop formed at the first leg;

a second loop formed at the second leg;

the first loop, lying in a first plane;

the second loop lying in a second plane;

the first plane generally orthogonal to the second plane;

the first loop having a first gap therethrough configured to receive the support cord and the alignment wire into the first loop;

the second loop having a second gap therethrough configured to receive the support cord into the second loop;

wherein the first loop engages the support cord, wherein the support cord and the alignment wire are within the first loop;

wherein the supporting bracket is configured to be rotated about the first loop such that the support cord is in contact with opposite interior sides of the first loop, and whereby the supporting bracket may thence be further rotated wherein the second loop engages the support cord and the support cord engages an interior side of the second loop;

the supporting bracket, capturing the alignment wire, and capturing the plant;

wherein the alignment wire maintains vertical orientation of the plant substantially above the point at which the plant protrudes from the ground;

the spiral curve having an open region on the bottom thereof at an angle between 90° and 0° from the curve of the hanging hook;

the spiral curve allowing the vertical alignment wire to be set upon the support cord past the open region, whereupon the alignment wire is rotated about a vertical axis to engage the support cord to restrict the ability of the hook to be accidentally removed from the support cord.

* * * * *